P. WRIGHT.
Traveling Hay Press.
No. 230,100. Patented July 13, 1880.
6 Sheets—Sheet 3.
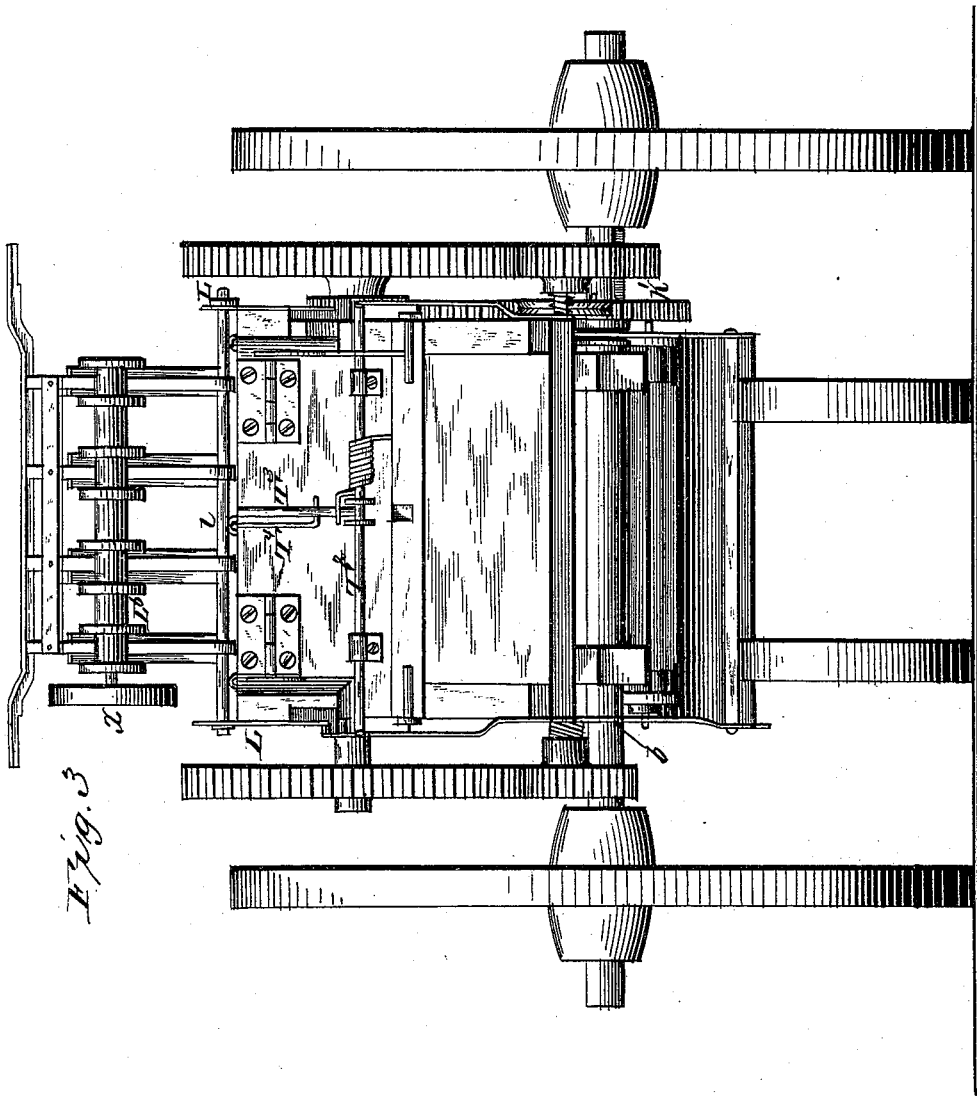
Witnesses.
F. L. Girraud
S. Clay Smith
Inventor
Parvin Wright
By. H. J. Ennis.
Attorney

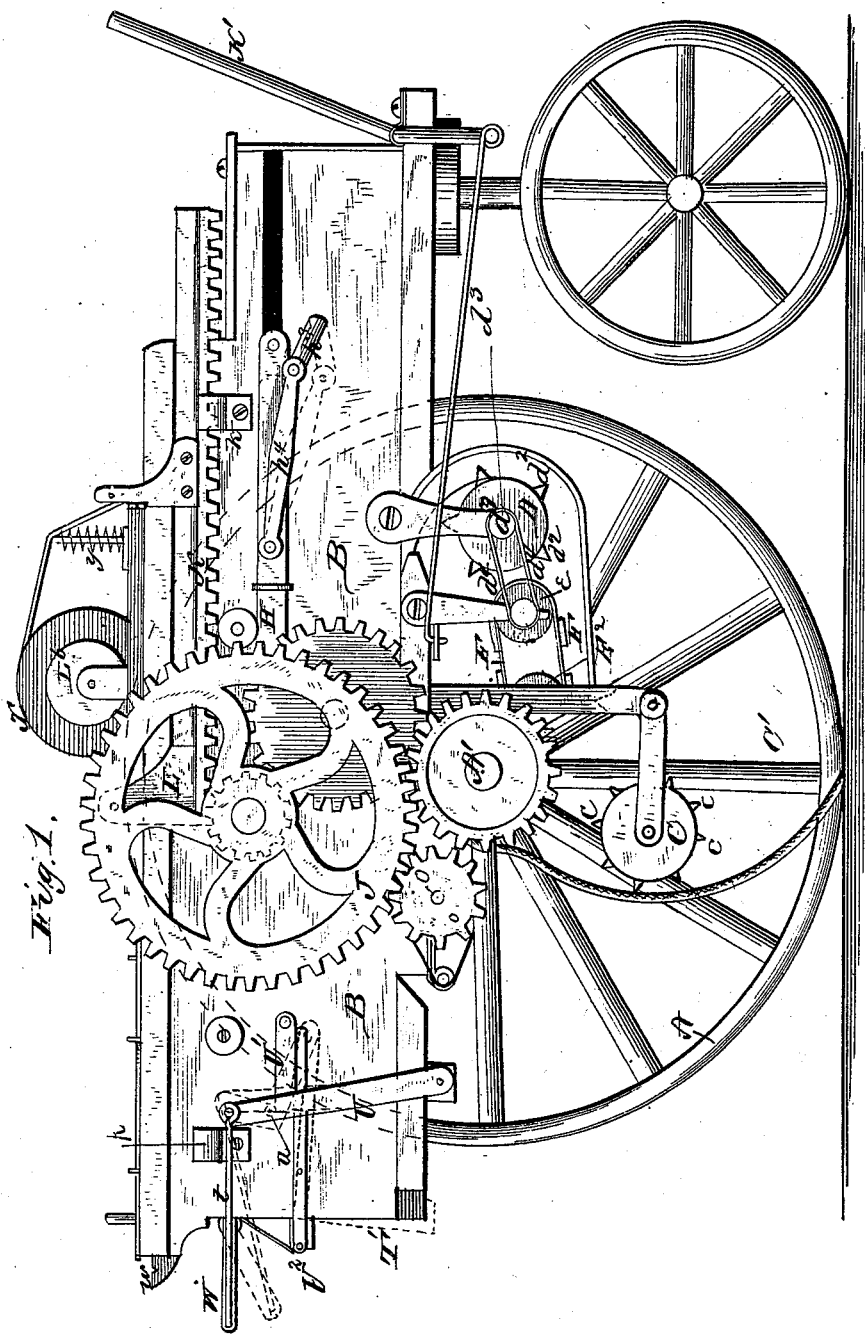

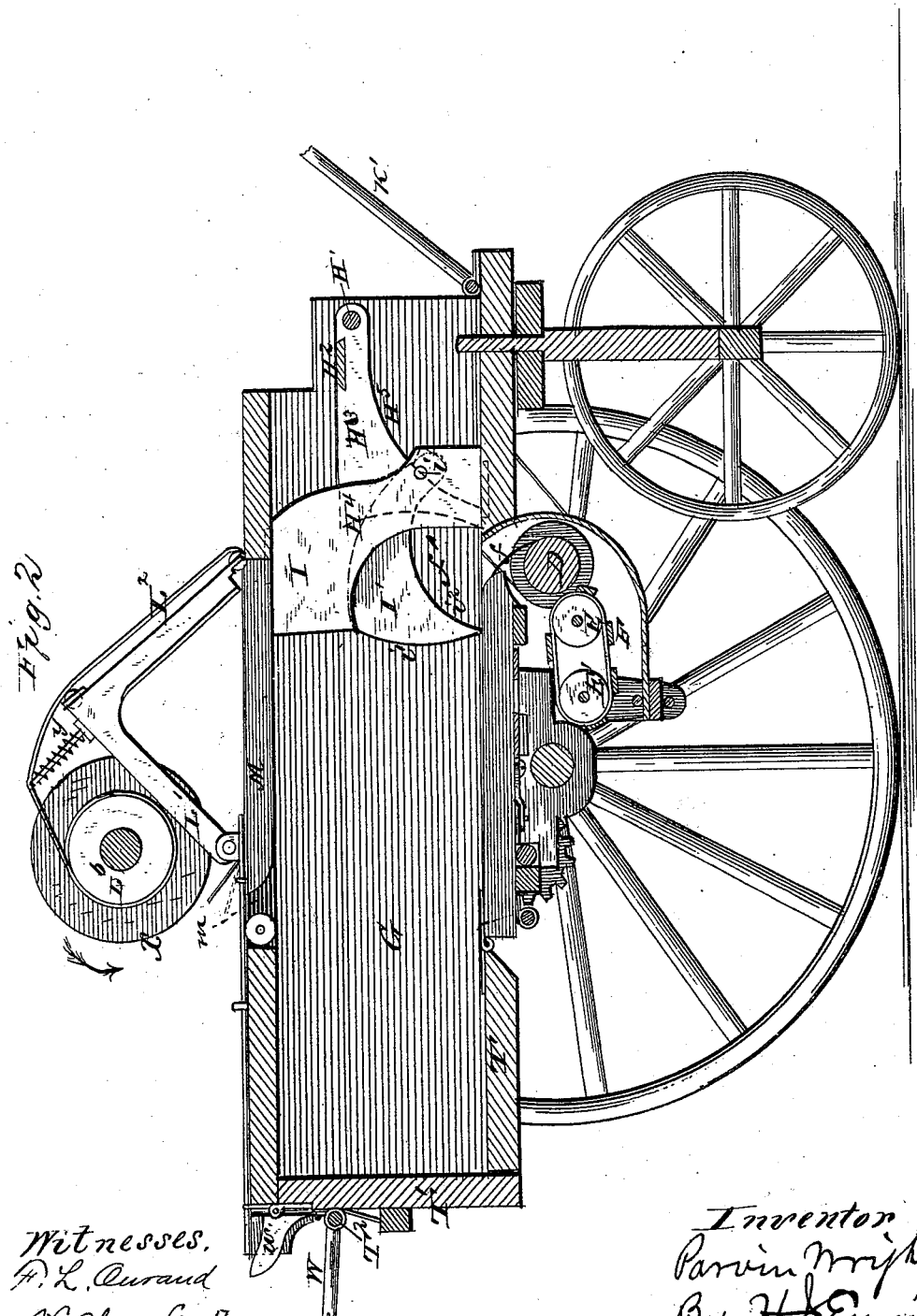

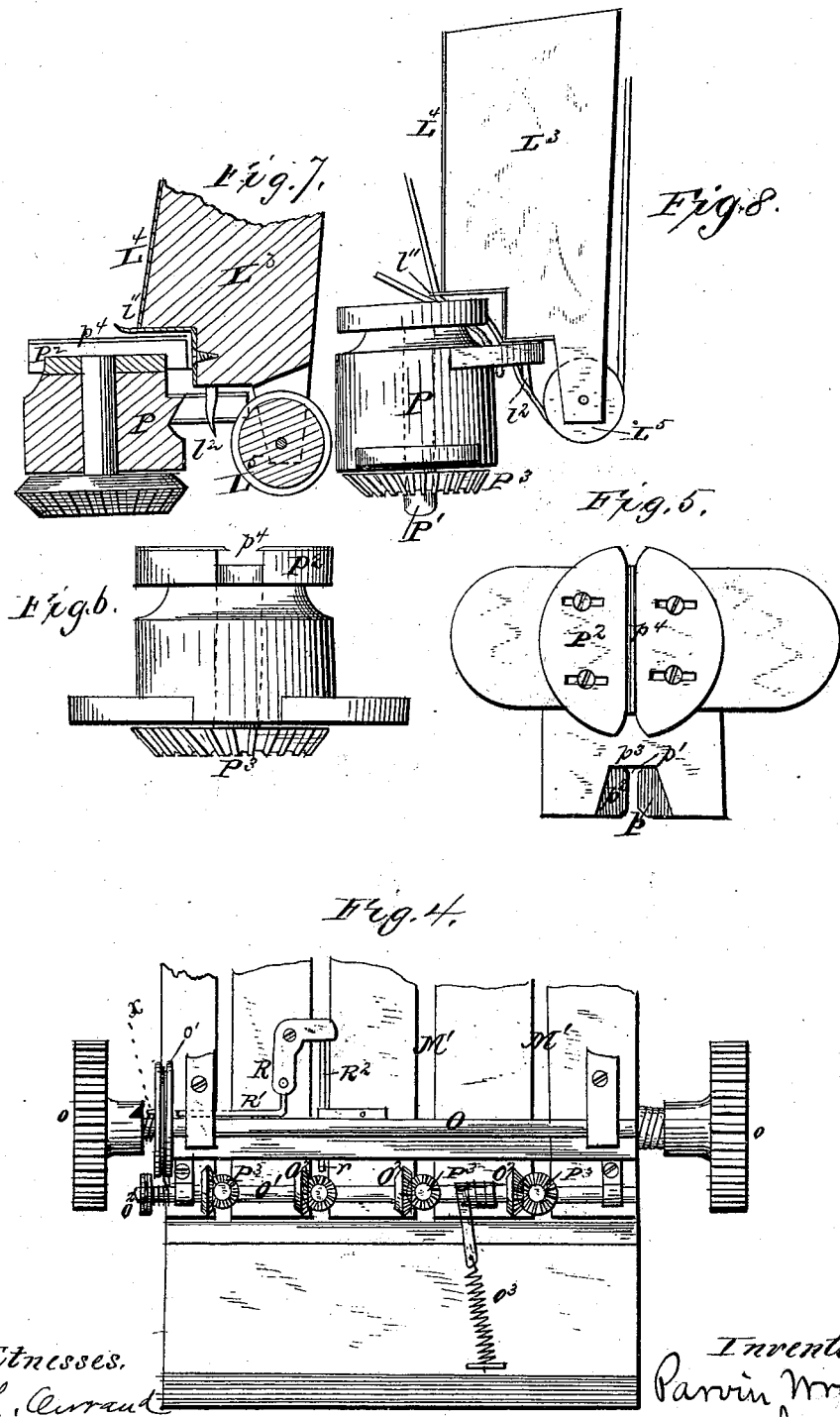

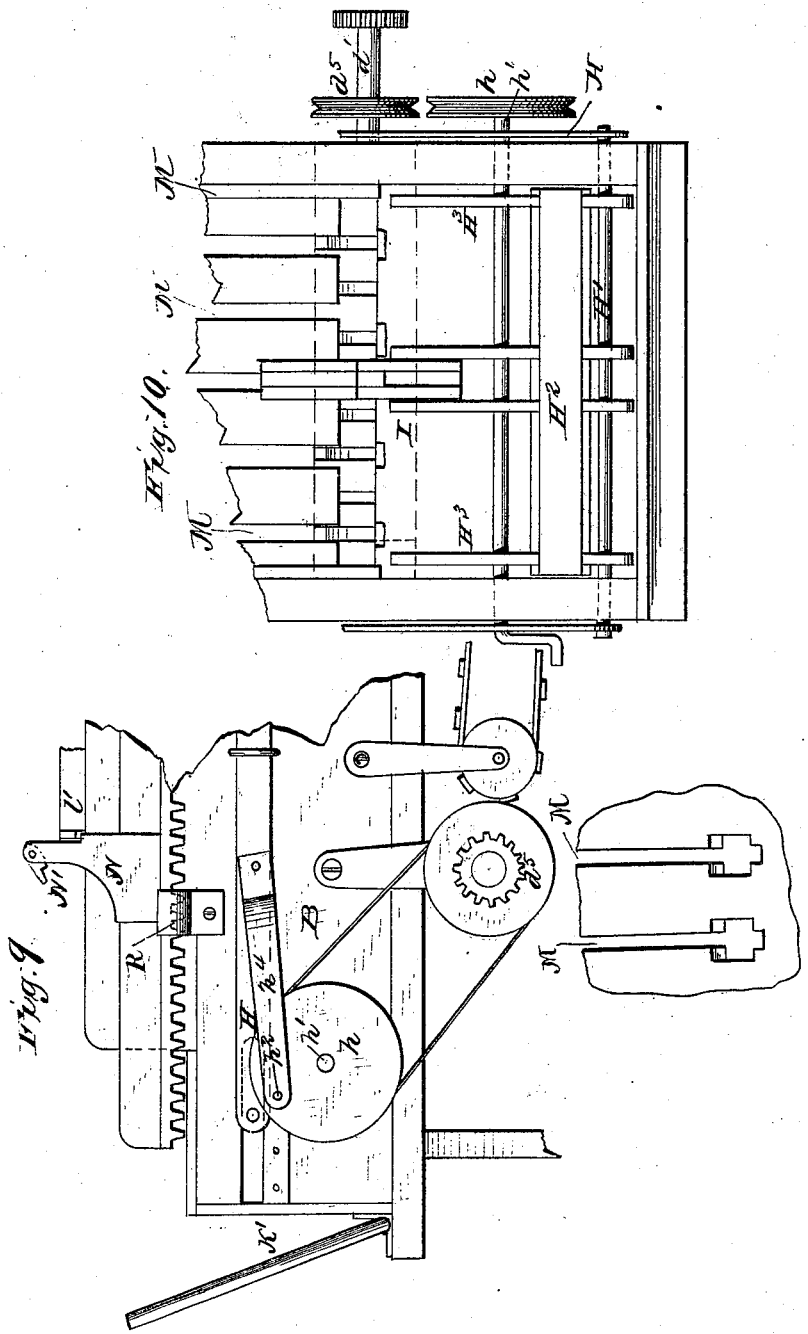

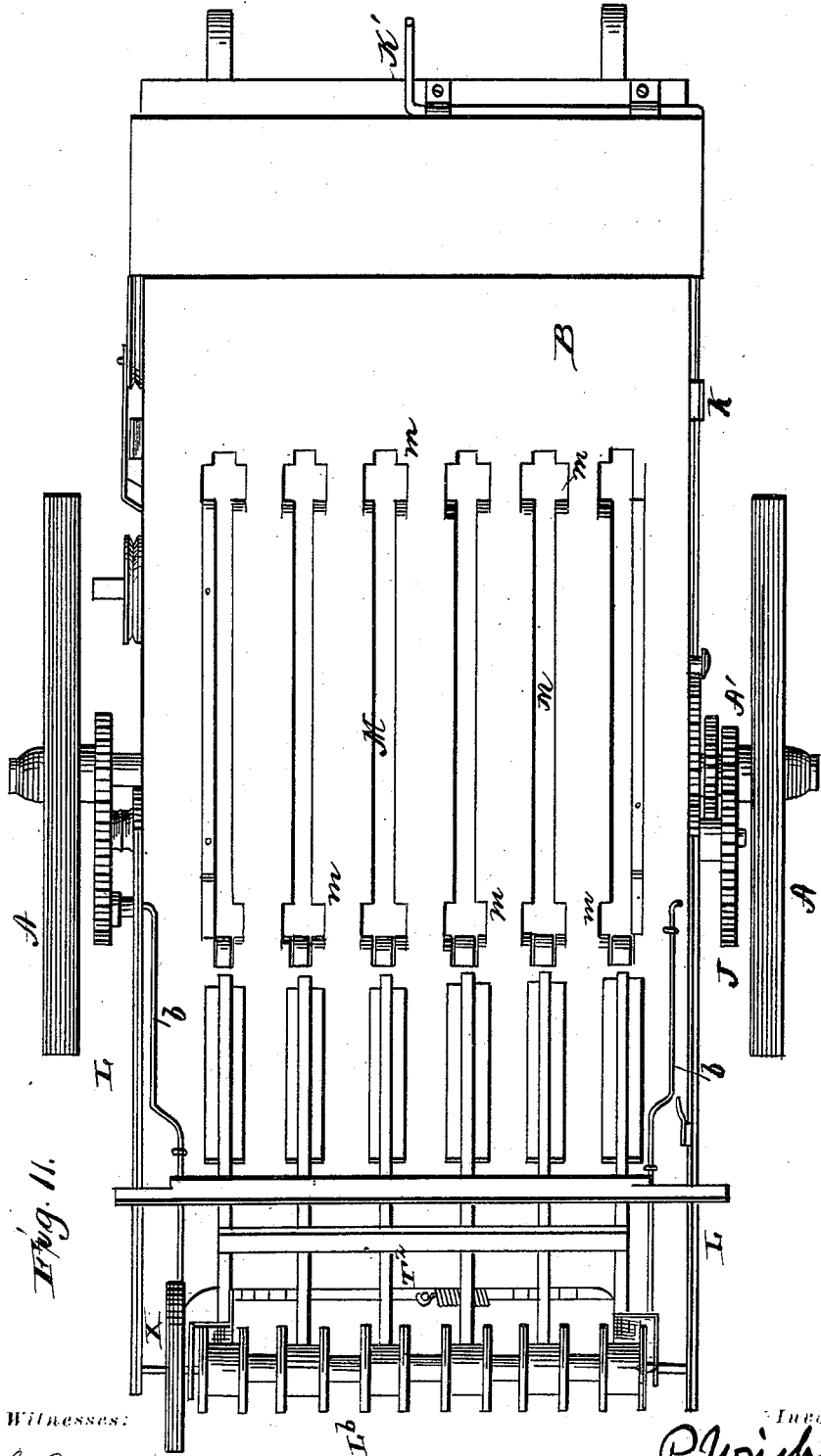

UNITED STATES PATENT OFFICE.

PARVIN WRIGHT, OF ROCK CREEK, WYOMING TERRITORY.

TRAVELING HAY-PRESS.

SPECIFICATION forming part of Letters Patent No. 230,100, dated July 13, 1880.

Application filed May 24, 1879.

*To all whom it may concern:*

Be it known that I, PARVIN WRIGHT, of Rock Creek, in the county of Albany and Territory of Wyoming, have invented certain new and useful Improvements in Traveling Hay-Presses; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a side elevation with the nearest driving-wheel removed. Fig. 2 is a sectional side elevation. Fig. 3 is a rear-end elevation. Fig. 4 is a partial bottom-plan view. Figs. 5, 6, 7, and 8 are detail views of tying device. Fig. 9 is a partial side elevation. Fig. 10 is a partial plan view, and Fig. 11 represents a top view of my improved apparatus.

My invention relates to a baling-press upon wheels, constructed and adapted, in connection with a hay-raking device, to rake, gather, and press the hay into bales, to automatically bind or tie the same, and also automatically to expel the bale thus formed; and the novelty consists in the construction and arrangement of parts, as will be more fully hereinafter set forth.

The invention is designed as an improvement upon the device patented to myself and R. B. Wright, June 18, 1878, No. 205,026.

The object of the invention is to provide a machine which shall be so constructed as to collect and gather the hay, press it into bales and bind the said bales, and to automatically deposit the bales thus formed, the whole operation being performed while the device is being drawn through a meadow, and which at the same time shall be convenient, practical, and reliable in operation.

To this end the invention consists, first, in a carrier situated adjacent to the carrying-platform, the same being adapted to receive the hay from the receiving-roll and conduct it to the feed-roll, which conducts it to the press, as will be presently more fully explained.

The second part of my invention consists in a novel and efficient system of devices for taking the hay from the feed-roll and conveying it as fast as gathered to the press-box within the grasp of the pressing device.

I provide a hinged or pivoted frame working upon a reciprocating sliding frame in proper guides, propelled by an eccentric attachment from the feed-roll. The free ends of the arms of this frame are abrupt, to give a broad and efficient bearing-surface upon the hay to force the hay toward the press; but an incline upon the lower surface allows the frame to ride idly over the hay which has gathered from the feed-roll during the preceding operation of the frame. At a point about the end of the stroke of the feed-frame are pivoted levers having similar abrupt and inclined surfaces, and the hay forced forward by the frame impinging upon the inclined surface raises the pivoted levers until the frame has completed its stroke, when they gravitate behind the hay and hold it within the plane of the grasp of the pressing device, and the frames, by their inclines, when they return, ride idly over the hay received during the stroke.

The third part of my invention relates to a pressing-frame which, while it operates horizontally to press the hay into a bale, is not only automatically elevated to return for the grasp of the hay which forms the succeeding bale, but when so elevated the pressing-arms are placed entirely out of the way of the succeeding hay.

By this construction the vertical press-arms are elevated to allow the entrance of the succeeding bale as soon as the preceding bale is pressed and bound, and a continuous operation in this art is established.

The fourth part of my invention consists in a binding, cutting, and tying device operated automatically with the motive operating-power of the machine, such devices operating in connection with a spring trip-bar, which returns the tying device to a proper position for a subsequent operation, as will presently be explained.

The fifth part of my invention relates to an automatic device composed of levers and the like, which not only hold the end and bottom of the press-box in secure and immovable lock when at rest by levers and arms resting at a dead-center, but which will unlock and open said parts automatically and deposit the bale, bound and tied, upon the ground of the meadow.

Referring to the drawings, in carrying out my invention I employ ordinary running-gear consisting of two forward guide-wheels and two rear riding-wheels, A, the latter being hung upon a rigid revolving shaft A', journaled in the body B at $b$, as shown. This body contains the press-box and other parts of the machine, as shown.

Upon one of the wheels A is secured a double-cogged gear, (not shown,) which operates the receiving-roll C, having radial arms or teeth $c$, operating in front of the spring rake-teeth C', and also meshes with a pinion upon a shaft, $d'$, carrying the feed-roll D, having projecting teeth $d^2$.

A pulley, $d^3$, connects by a belt, $d^4$, with and operates over a pulley, $e$, on a roll, E, over which, in connection with the roll E', operates an endless carrying-belt, F, as shown. A suitable guard, $E^2$, protects the belt F and feed-roll D, and prevents the hay from coming in contact with them, except through the proper channel. From this construction the hay is caught by the spring rake-teeth C', and, passing up the incline of the said teeth, is taken by the receiving-roll C and passed to the carrier F, which conveys it to the feed-roll D, from whence it is fed through an aperture, $f$, into a receiving-chamber, $f'$, which forms a chute leading to the press-box G, as shown in Figs. 1 and 2.

A pulley, $d^5$, upon the shaft of the feed-roll D connects by a belt with a pulley, $h$, upon a shaft, $h'$, journaled in the body B, which carries an eccentric or crank connection, $h^2$, a similar crank, $h^3$, being formed upon the opposite end of the shaft $h'$. These cranks $h^2$ $h^3$ are connected by pitmen $h^4$ to a reciprocating sliding frame, H, working in guides upon the body B, and carrying a cross-bar, H', upon which is pivoted the framing $H^2$, having arms $H^3$, with abrupt surfaces $H^4$ and inclined surfaces $H^5$, as shown. Properly pivoted at $i$ in standards I is a gravitating arm or arms, I', having similar abrupt surfaces $i'$ and inclined lower edge, $i^2$.

With each reciprocation or traverse of the feeder $H^2$ $H^3$ the hay from the chamber $f'$ is forced toward the press-box G until it passes the plane of the stroke of the arms I', they being elevated by the hay thus forced, when the said arms I' gravitate behind the hay and hold it in that position. The feeder is then withdrawn by the eccentrics, riding idly over the hay which has been received into the chamber $f'$ during the last forward movement, when it falls again into action and the operation is repeated.

Journaled in the body, upon each side, are driving-gears J, each having pinions which mesh with a sliding rack-bar, K, working in guides $k$ upon the sides of the body. This gearing corresponds, cog for cog, upon each side, to afford a perfectly corresponding operation, and a lever and sliding gear, K', throw the gear in or out of mesh, so as to reverse the traverse of the rack-bar at will, the means and mode of operation of which have been fully set forth in the Patent No. 205,026, hereinbefore mentioned, no novelty, therefore, being claimed in this application.

Standards L, arising from the rack-bar K, carry a shaft, $l$, having the pivoted press-frame, composed of the longitudinal arms L' and vertical arms $L^2$. These arms are composed of a shank, $L^3$, with bearing-plate $L^4$, and journaled in the lower end is a friction-pulley, $L^5$, which carries the binding-wire from the reels $L^6$ upon the top of the presser-frame.

The press-box, above and below, is provided with longitudinal slots, those on top, M, being enlarged at each end, forming lateral recesses $m$, as shown in Figs. 2 and 10 of the drawings, to allow the lateral bearing-plate L to rise out of the chamber or chute at the end of the stroke, to retire to the feed-chamber, and to allow it to be depressed at that point again into operation behind the hay.

Standards N upon the rack-bar K carry pendent catches N', which operate to receive the lateral arms $i'$ of the presser-frame, and hold the same down until the operation to release the bale serves to release the hooks N', as will be presently set forth.

The longitudinal slots M' in the bottom of the chute receive the lower ends of the arms $L^2$ in their traverse, and serve to allow the binding-wire to be carried around the bale.

A shaft, O, carries gear-pinions $o$, which are in constant mesh with the gear-wheels J, and a clutch-pulley, $o'$, is belted to a pulley, $o^2$, upon a shaft, O', carrying beveled gears $O^2$, to correspond with the bottom slots, M'. At the rear or bale end of each slot M' is secured a sleeve, P, provided with a projection or lug having an inclined holding-slot, $p$, with an inner enlarged eye, $p'$, and above the same a jaw, $p^2$, having an abrupt cutting-edge, $p^3$. Journaled within this sleeve is a shaft, P', carrying on the upper end a disk, $P^2$, having a jawed slot, $p^4$, and on the lower end a beveled gear, $P^3$, adapted to mesh into the rigid beveled gear $O^2$ upon the shaft O'.

A strap and spring, $o^3$, allow the shaft O' to revolve a sufficient number of times when the clutch $o'$ is in operation. When said clutch is released the spring forces the shaft O' so as to bring the jawed slots $p^4$ to correspond with the plane of the slots M'. A pivoted elbow-lever, R, connects, by a link, R', with the clutch $o'$, and an arm, $R^2$, with an abutting surface, $r$, which is operated by the extremity of one of the arms of the presser-frame at the end of its backward movement to throw the clutch $o'$ into operation, and to hold it until the arm $R^2$ $r$ is released by the presser-frame as it elevates. As soon as the arm $R^2$ $r$ is thus released a spring, $x$, between the pulley $o'$ and the gear, forces the clutch out of operation, and the spring $o^3$ returns the shaft O' and connections until the slots $p^4$ in the disk $P^2$ are in position to receive the wire in the subsequent operation. A jawed arm, $l''$, serves to force the wires into the slot $p^4$, and a lug, $l^2$, to force the wire into the inclined holding-slot $p$.

The binding-wire feeds off from the reel $L^6$ down and over the friction-pulley $L^5$. The end of the said wire being grasped by the holding-slot $p$, the bulk of the same is carried upward, down, and around the hay as it is pressed, the arm $L^2$, as it reaches the end of its stroke, abuts against the cutter and twister, the wire is severed by the edge $p^3$, the lug $l^2$ forces the piece of wire severed from the end through the holding-slot $p$, and it drops through the eye $p'$, the rear end then being caught in the jaw. The arm $l''$ forces the two ends into the slot $p^4$, the clutch $o'$ is thrown into operation, and the disk is revolved until the ends are twisted around the bale, firmly and securely tying the same. The bale, as it is expelled, pulls the ends of the wire below the twisted portion or knot out of the slot, the clutch is tripped out of operation, and the bar $O'$ flies back and leaves the slot $p^4$ in position, the end of the bulk of the wire during the above described operation being held or grasped in the slot $p$, so that the bulk of the wire is again carried upward, down, and around the hay, and the operation repeated for tying the next succeeding bale. The traverse of the presser-frame is so much greater than the space occupied by the bale when pressed that in each operation much loose wire remains, and to afford successful and efficient operation I provide one or more friction-pulleys, X, rigid with the shafts of the reels, and these pulleys bear upon flexible friction-ways upon the top of the body, and serve to take up the slack in the wire by reversing the reels, or, as it were, winding them up as the presser-frame traverses horizontally toward the press-box. The press-box has a hinged falling bottom, T, which connects by a link, U, to an elbow-lever, U', pivoted at $u$ upon the body. A link, $U^2$, from the opposite end of the elbow-lever U' connects pivotally with a hinged back, T'. A bar, $T^2$, across the back, having a rigid lever, $T^3$, is operated upon by a sliding lever, $T^4$, which being forced rearward operates the lever $T^3$ to turn the same, and crank-arms W, connected by a rigid link, $t$, to the upper arm of the elbow-lever U', serve to automatically open both back and bottom of the bale-box, and the bale gravitates to the ground. Arms $w$ upon the rear door operate, when the door is open, to act upon sliding bars and trip the catches to release the presser-frame, which elevates over the friction-rollers for a succeeding operation.

It will be observed that by the peculiar construction and arrangement of the levers and arms which hold and operate the hinged doors of the bale-box the entire device stands at rest at a dead-center, and can only be operated through the lever $T^3$.

To accommodate differences in feed of the baling-wire, owing to the variety of the diameter of the wire on the reel as it is full or nearly used up, I provide a tension-spring, $y$, which relieves any immediate strain by its compression, but readily takes up immediate slack by its constant force outward.

What I claim as new, and desire to secure by Letters Patent of the United States, is—

1. The rolls E E', endless belt F, and belt $d^4$, combined with the feed-roll D $d^2$, receiving-roll C $c$, guard $E^2$, and rake C', as and for the purpose set forth.

2. In a traveling hay-press, the combination of a gatherer, carrier, feeder, holder, and press, all operating automatically to take the hay from the ground and press it into a bale, as set forth.

3. In a traveling hay-press, the combination of a rake, a carrier, a feeder, a holder, a press, and a binder, all operating automatically to gather, convey, press, and bind the bale thus formed, as herein specified.

4. In a traveling hay-press, the combination of a rake, carrier, feeder, holder, press, binder, and means for ejecting the bale, all operating automatically to gather, carry, feed, hold, press, bind, and deposit the bale formed, substantially as set forth.

5. The rake, receiver, carrier, and feed-roll, combined with the guard $E^2$, the reciprocating feeder, and the holder, all working automatically in a traveling hay-press, as and for the purposes specified.

6. In a traveling hay-press, the reciprocating automatically-acting frame H, carrying bar H', combined with the pivoted frames $H^2$ $H^3$, having abrupt surfaces $H^4$ and inclined surfaces $H^5$, as set forth.

7. In a traveling hay-press, the combination, with the automatic reciprocating feeder, of holders I', pivoted at $i$ in the standards I, and having abrupt surfaces $i$ and inclined surfaces $i^2$, as and for the purposes specified.

8. In a traveling hay-press, the combination of the automatically-reciprocating feeder $H^2$ $H^3$ $H^4$ $H^5$ with the rake C', receiving-roll C $c$, carrier F, feed-roll D, guard $E^2$, and chamber $ff$, as and for the purpose set forth.

9. The combination of the rake C', receiver C $c$, carrier F, feed-roll D, feeder H, holder I $i$ $i^2$, and guard $E^2$, all operating automatically, as and for the purposes set forth.

10. The feeder $H^2$ $H^3$ $H^4$ $H^5$ and holder I', combined with the reciprocating pressure-frame L' $L^2$ $l$, substantially as and for the purpose herein shown and described.

11. In a traveling hay-press, the combination of the reciprocating pressure-frame L' $L^2$ $l$ and the catches N N', substantially as and for the purpose herein shown and described.

12. In a traveling hay-press, the combination of the pressure-box, provided with the slots M M' and lateral recesses $m$, and the arms $L^2$, provided with bearing-plates $L^4$, substantially as and for the purpose herein shown and described.

13. The arm $L^2$, having arm $l''$ and lug $l^2$, combined with the sleeve P, having slot $p^2$, cutting-edge $p^3$, and the disk $P^2$ $p^4$, as and for the purpose set forth.

14. The combination of the inclined slot $p^2$, having eye $p'$ and cutting-edge $p^3$, with the lug $l^2$ on the arm $L^2$, as and for the purpose set forth.

15. The clutch $o'$ and presser-frame, with their automatic connections R R' $R^2$ $r$, in combination with the gear $o$, shaft O', gears $O^2$ $P^2$, spring $O^3$, and movable slotted disk $P^2$, as set forth.

16. The hinged doors T T', bar $T^2$, $T^3$, and $T^4$, presser-frame L' $L^2$, arms $w$, and hooks N', combined with connected sliding rods, as set forth.

In testimony that I claim the foregoing I have hereunto set my hand this 24th day of May, 1879.

PARVIN WRIGHT.

Witnesses:
H. CLAY SMITH,
H. J. ENNIS.